United States Patent [19]

Ohsawa

[11] Patent Number: 4,846,324
[45] Date of Patent: Jul. 11, 1989

[54] ELECTROMAGNETIC SPRING CLUTCH

[75] Inventor: Masanori Ohsawa, Iida, Japan

[73] Assignee: Tenryu Marusawa Kabushiki Kaisha, Iida, Japan

[21] Appl. No.: 85,044

[22] Filed: Aug. 12, 1987

[30] Foreign Application Priority Data

Aug. 26, 1986 [JP] Japan .......................... 61-129990[U]

[51] Int. Cl.$^4$ ...................... F16D 27/10; F16D 13/08
[52] U.S. Cl. ................................. 192/35; 192/81 C; 192/84 T; 192/90
[58] Field of Search ..................... 192/35, 81 C, 84 T, 192/90, 12 BA, 36; 335/279, 281

[56] References Cited

U.S. PATENT DOCUMENTS

| 3,006,448 | 10/1961 | Fox | 192/81 C |
| 3,185,276 | 5/1965 | Sajovec, Jr. | 192/81 C |
| 3,637,056 | 1/1972 | Baer | 192/84 T X |
| 3,934,690 | 1/1976 | Janning | 192/84 T |
| 4,263,995 | 4/1981 | Wahlstedt | 192/35 |
| 4,321,992 | 3/1982 | Gallo | 192/81 C |
| 4,638,899 | 1/1987 | Kossett | 192/81 C |

FOREIGN PATENT DOCUMENTS 52721 6/1982 European Pat. Off. .......... 192/84 T

Primary Examiner—Leslie A. Braun
Assistant Examiner—Richard M. Lorence
Attorney, Agent, or Firm—Jordan and Hamburg

[57] ABSTRACT

In order to simplify the structure of the armature of an electromagnetic spring clutch and to lower the raw material cost, the armature is cylindrical and the field core is composed of a core section with a U-shaped bracket section having open sides and an open end and a yoke section fixed to the open end of the bracket section and having a through-hole in its middle in which the armature is inserted.

13 Claims, 7 Drawing Sheets

ELECTROMAGNETIC SPRING CLUTCH

FIELD OF THE INVENTION AND RELATED ART STATEMENT

This invention relates to an eletromagnetic spring clutch.

The conventional electromagnetic spring clutch will be described by reference to FIG. 8.

In FIG. 8(a), a field core 500 is in the form of cylinder, has an electromagnetic coil 502 fixed inside, and has a slave driving axle 510 having an extended section 506 and inserted slidably therein An armature 508 has a flange 510 and rotatably covers the slave driving axle 504. A coil spring 512 is mounted between the armature 508 and the slave driving axle 504 in such a way that one end thereof is fixed on the armature, the other end being fixed on a master driving axle 514 covering rotatably the slave driving axle 504.

When no current is passing through the electromagnetic coil 502, an input of turning effort onto an input gear 515 on the master driving axle 514 from an input device (not shown) will allow the armature 508, coil spring 512, and master driving axle 514 to rotate together over the non-rotating slave driving axle 504.

When current is passed through the electromagnetic coil 502 for excitation, as illustrated in FIG. 8(b), a magnetic circuit indicated by broken line D is generated through the field core 500, flange 510, and armature 508.

Therefore, for the magnetic circuit to be effective, the flange 510 needs to be formed in such a circle as covers the open section of the field core 500.

Upon formation of the magnetic circuit, the extended section 506 of the slave driving axle 504 and the armature 508 are attracted to the field core 500. The inner end face of the armature 508 will come into contact with the extended section 506 of the slave driving axle 504, the frictional force thus generated will brake the rotation of the armature 508, the coil spring 512, having the ends thereof fixed on the armature 508 and on the master driving axle 514, will be caused to be wound more tightly by the braked rotation of the armature 508 to such a decreased diameter as to come into tight contact with the slave driving axle 504, and the slave driving axle 504 will be set to rotate with transmission of the turning effort input onto the master driving axle 514 to a rotated part (not shown).

The conventional electromagnetic spring clutch described above raises problems as follows.

The armature and flange are formed in a body, so that, if they are to be cut from a round steel, considerable material waste and too long processing time are unavoidable. The outer diameter and set position of the flange need to be adjusted in accordance with the thickness and outer diameter of the field core, which adjustment requires a tedious job. Furthermore, so high a precision is required that a considerable number of rejected products are produced.

OBJECT AND SUMMARY OF THE INVENTION

The object of this invention is to provide simple-structure low-cost electromagnetic spring clutches.

The core section composing the field core is formed in a bracket shape in section, the electromagnetic coil is provided in the bracket-shaped core section, and a yoke section, which has in its middle a cylindrical through-hole capable of movably supporting an armature, etc.

This structure makes unnecessary the conventional flange to be formed on the armature, and allows the armature to assume a simple form of cylinder. Thus, the armature adopted in this invention is simple in shape and structure as compared with the conventional, requires shorter cutting time in production, and requires so low a cutting precision that the number of rejected products may be reduced. Furthermore, no flange needs to be formed by cutting out, which results in decrease in material waste. As seen from the above description, this invention is capable of providing products at such a low cost as to be very effective technologically and economically.

DETAILED DESCRIPTION OF PREFERRED EMBODIMENTS

Some preferred embodiments will be described in detail by reference to the accompanying drawings.

FIRST EMBODIMENT

Figure 1:
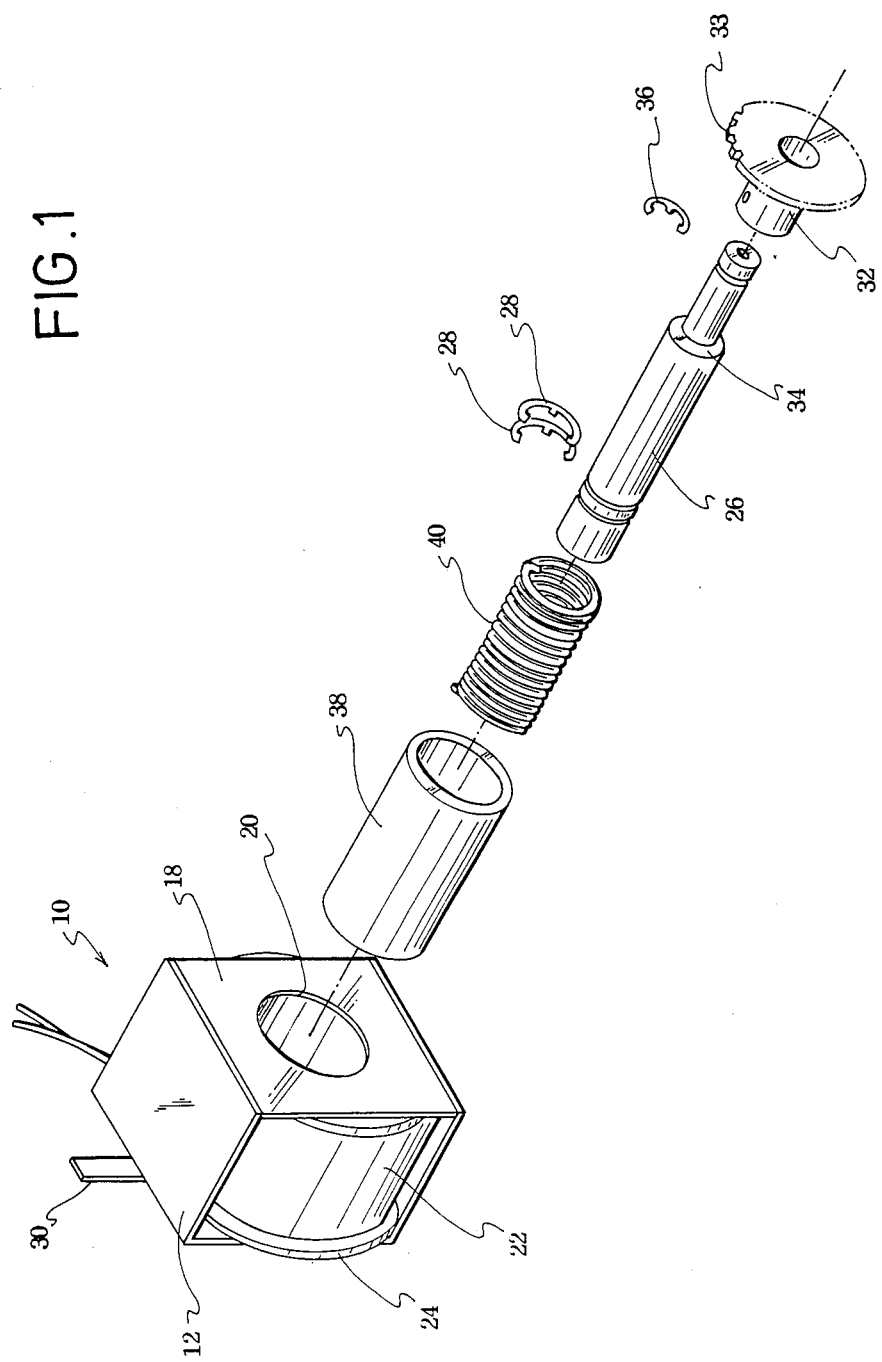
FIG. 1 shows a perspective view of a first embodiment of electromagnetic spring clutch.
Figure 2A:
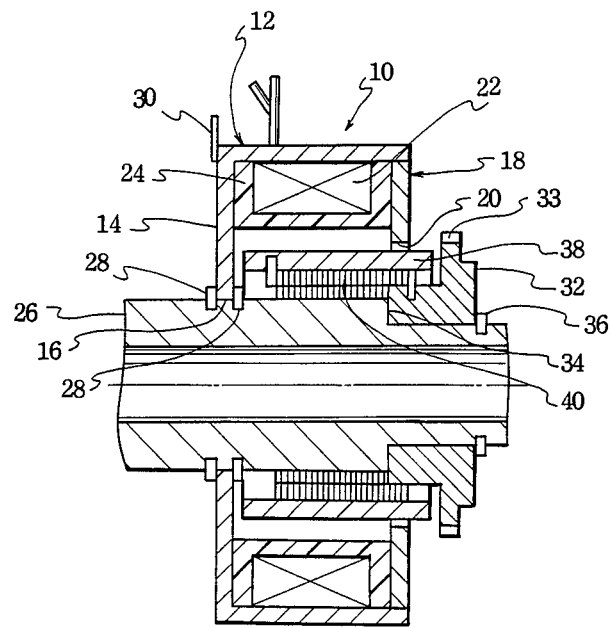
FIG. 2(a) shows a front sectional view of the first embodiment of electromagnetic spring clutch while no current is passing.

First, the perspective view of FIG. 1 and the sectional view of FIG. 2(a) will be used to describe the composition.

A core section 12 constitutes part of the field core 10. The core section 12 is formed by bending a sheet of rectangular iron plate, a magnetizable material, into a bracket form. Both sides of the core section 12 are open, and in the middle of the vertical plane 14 thereof there is bored a through-hole 16 through which a slave driving axle, to be described later, is inserted rotatably.

A yoke section 18, together with the core section 12, constitutes the field core 10. In the middle of the yoke section 18 there is bored a through-hole 20 through which an armature, etc., to be described later, are inserted. The yoke section 18 is fixed on the ends of the open side of the bracket form of core section 12 by a suitable method such as insertion under pressure.

An electromagnetic coil 22 is formed by winding a wire on a plastic coil spool 24, a non-magnetizable material, and set in the field core 10.

A slave driving axle 26 is rotatably inserted in both the through-hole in the core section 12 of the field core 10 and the through-hole 20 in the yoke section 18.

The position of the field core 10 on the slave driving axle 26 in the axial direction is determined by retaining rings 28 and 28. The field core 10 itself is supported stationarily on a suitable part by a rotation stopper 30.

A master driving axle 32 has an input gear 33, is caught by a step 34 formed on the slave driving axle 26, and is positioned on the outer face of the slave driving axle 26 by a retaining ring 36. The master driving axle 32 is mounted rotatably over the slave driving axle 26.

An armature 38 is a hollow round rod made of a magnetizable material and is mounted rotatably on both the slave driving axle 26 and the master driving axle 32.

A coil spring 40 is mounted between the armature 38 and the outer faces of both the slave driving axle 26 and the master driving axle 32, one end thereof being caught on the inner wall of the armature 38 and the other end on the outer face of the master driving axle 32.

The master driving axle 32 is connected to an input device not shown via the input gear 33, and the slave driving axle 26 is connected to a rotated part not shown.

The action of the system will be described.

The state shown in FIG. 2(a) is one where no current is passing through the electromagnetic coil 22, with the slave driving axle 26 stopping. The master driving axle 32 is receiving turning effort from an input device not shown, rotating together with the coil spring 40 and the armature 38.

Figure 2B:
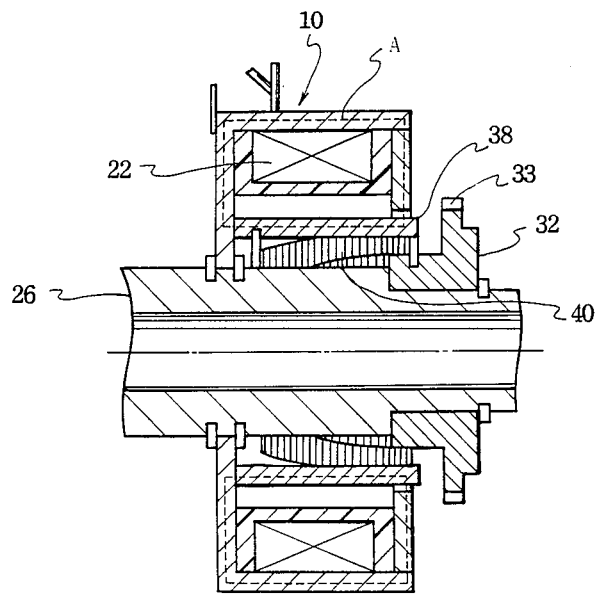
FIG. 2('b) shows a front sectional view of the first embodiment while current is passing.

When current is passed through the electromagnetic coil 22 in order to rotate the slave driving axle 26 and thereby transmit the turning effort applied by the input device to a rotated part (not shown) a magnetic circuit indicated by broken line A in FIG. 2(b) is generated on the field core 10 and the armature 38.

The inner end face of the armature 38 is attracted by the magnetic force and comes into contact with the inner wall of the field core 10. The master driving axle 32 keeps rotating under the turning effort, whereas the armature 38 is caused to decrease in the speed of rotation by the frictional force generated between the inner end face thereof and the field core 10 in contact with each other.

The ends of the coil spring 40 are fixed on the armature 38 and the master driving axle 32 and thus, the coil spring 40 will have the inner diameter thereof decreased until it comes into tight contact with the outer face of the slave driving axle 26.

When the coil spring 40 has been brought into contact with and slave driving axle 26 under application of more than a prescribed force, i.e., the turning effort applied on the master driving axle 32 has exceeded the frictional force having been holding the armature 38 from rotation, the slave driving axle 26 begins to rotate together with the master driving axle 32. The slave driving axle 26, now having been set to rotate, will transmit the turning effort applied from an input device to a rotated part not shown.

The rotation of the slave driving axle 26 is stopped by turning off the current to the electromagnetic coil 22. The magnetic field is caused to disappear, the attraction between the inner wall of the armature 38 and the field core 10 is released, the tight contact of the coil spring 40 with the slave driving axle 26 is loosened, and the rotation of the slave driving axle 26 is stopped. Then, the master driving axle 32, coil spring 40, and armature 38 will resume to rotate together under the application of the turning effort from the input device.

Figure 3:
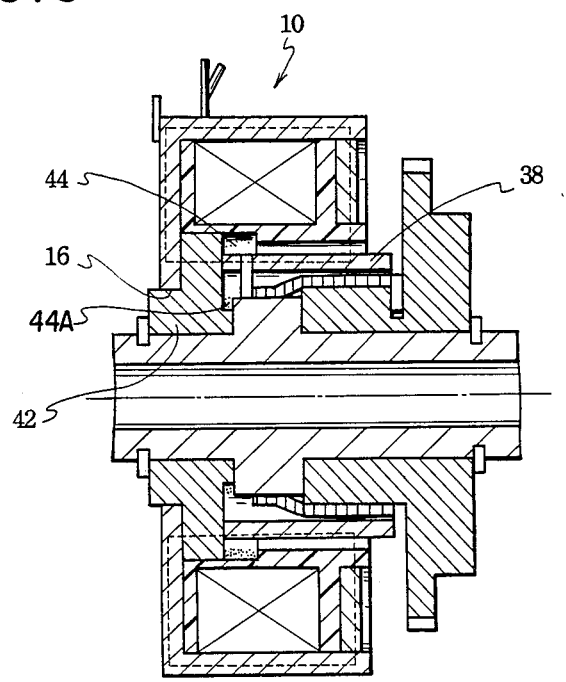
FIG. 3 shows a front sectional view of the first embodiment of electromagnetic spring clutch provided with an abraded powder reservoir.

With the electromagnetic spring clutch of this embodiment, when the inner end face of the armature 38 is brought into contact with the inner face of vertical face 14 of the field core 10, the contact section of both the faces is subject to abrasion. For suppressing the abrasion of the armature 38 and smooth rotation of the slave driving axle 26, a bearing 42 made of oilless iron metal, a magnetizable material, is inserted and fixed in the through-hole 16 of the field core 10, as shown in FIG. 3.

Furthermore, the abraded powder still produced is prevented from being left at movable sections by being designed to stay in abraded powder reservoirs 44 and 44A provided inside the field core 10.

Figure 4:
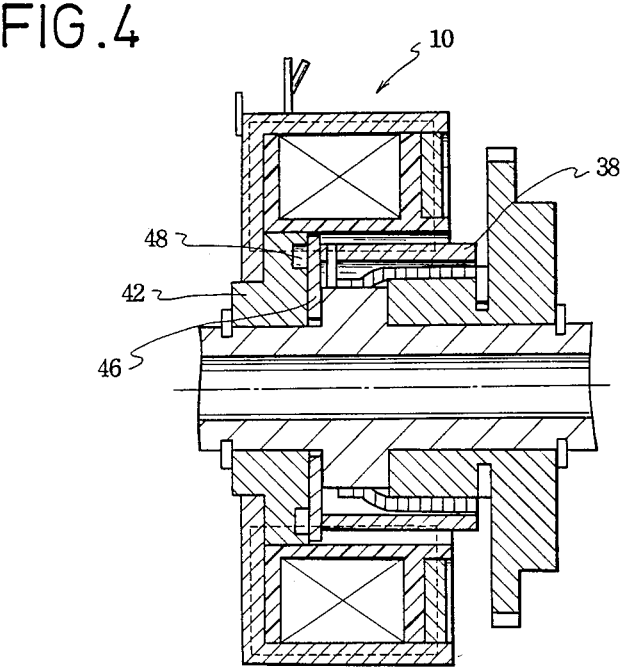
FIG. 4 shows a front sectional view of the first embodiment of electromagnetic spring clutch provided with a plate.

In FIG. 4, the abrasion of the armature 38 is further suppressed by providing a plate 46 made of a magnetizable material so that is may migrate to the position of contact when the inner end face of the armature 38 is attracted in the field core 10 and designing the plate 46 to be capable of rotating together with the armature 38. The abraded powder produced through the friction between the plate 46 and the bearing 42 is caught by the abraded powder reservoir 48.

Figure 5:
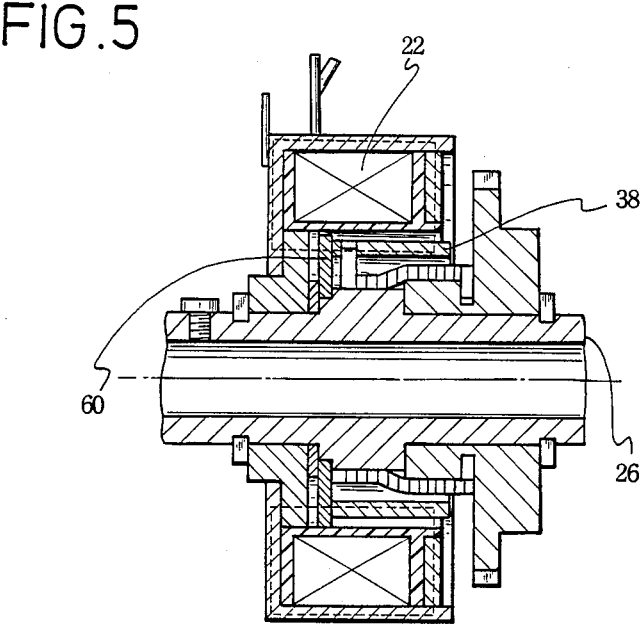
FIG. 5 shows a front sectional view of the first embodiment of electromagnetic spring clutch provided with a flange section on a slave driving axle.

In FIG. 5, too, the abrasion of the armature 38 is suppressed by providing a flange section 60 formed by a magnetizable material and fixed on the outer face of the slave driving axle 26. While the current passing through the electromagnetic coil 22, the inner end face of the armature 38 comes into contact with the flange section 60 then the flange section 60 and the armature 38 begin to rotate together so that the abrasion of the armature 38 will be suppressed.

Figure 6:
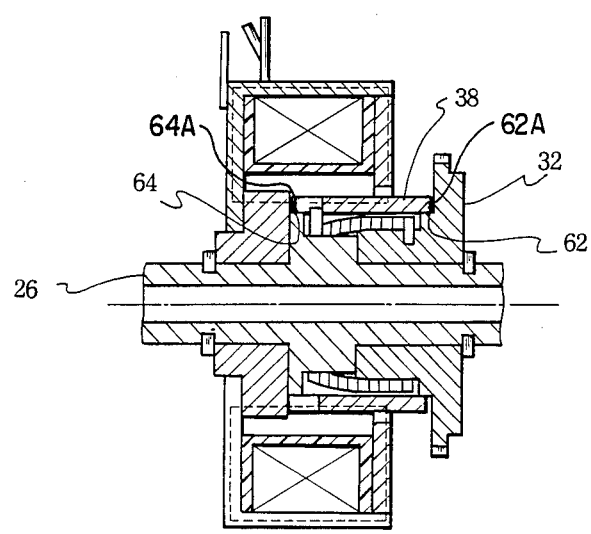
FIG. 6 shows a front sectional view of the first embodiment of electromagnetic spring clutch provided large diameter sections on a master and a slave driving axles.

Next, in FIG. 6, there are provided large diameter sections 62 and 64 on the outer faces of the master and slave driving axles 32 and 26 to guide approximate circular rotation of the armature 38. Additionally, the outer faces of the large diameter sections 62 and 64 facing the inner face of the armature 38 are coated by a non-magnetizable material 62A, 64A prevent from braking action by residual magnetism.

SECOND EMBODIMENT

A second embodiment will be described by reference to FIG. 7.

The field core 100 composed of the core section 102 and the yoke section 104 and the electromagnetic coil 106 in FIG. 7 (a) have the same shapes and composition as those in the first embodiment, so that description will not refer to them.

A bearing 108 is made of oilless iron metal, a magnetizable material, is inserted and fixed in a through-hole 110 on a field core 100, and has a slave driving axle 112 inserted rotatably. As with the first embodiment, the bearing 108 is provided in order to prevent an armature 114 from being worn when it comes into contact with the end face of the armature 114, and to make rotation of the slave driving axle 112 smoothly.

A master driving axle 116 covers the slave driving axle 112 rotatably as in the first embodiment.

The armature 114 is made of a magnetizable material in the form of cylinder and covers the slave driving axle 112 and the master driving axle 116 rotatably. At the outer end section of the armature 114 there is provided a slit 118 to catch the end section of a coil spring to be described later.

A coil spring 120, while no current is passing through the electromagnetic coil 106, winds tightly on the outer faces of both the slave driving axle 112 and the master driving axle 116 to connect both the axles 112 and 116 with each other. The outer end section of the coil spring 120 is caught by the slit 118 provided on the armature 114.

The action of the system will be described.

Figure 7A:
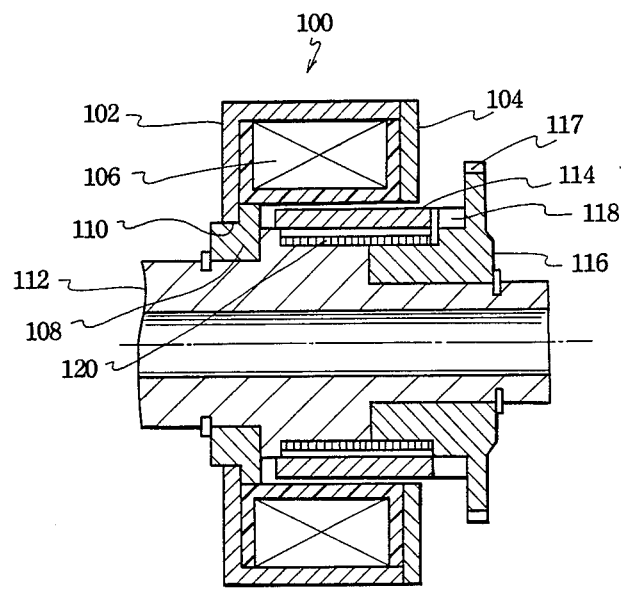
FIG. 7(a) shows a front sectional view of a second embodiment of electromagnetic spring clutch while no current is passing.

In the ordinary state, as shown in FIG. 7(a), the slave driving axle 112 and the master driving axle 116 are connected with each other by being wound tightly by the coil spring 120. Therefore, when a turning effort is applied on the master driving axle 116 from an input device not shown via an input gear 117 and allows the master driving axle 116 to rotate in the prescribed direction, i.e., so that the coil spring 120 gets tightened, the slave driving axle 112 is set to rotate together with the master driving axle 116. Thus, the slave driving axle 112 may transmit the turning effort input from an input device to a rotated part (not shown).

Figure 7B:
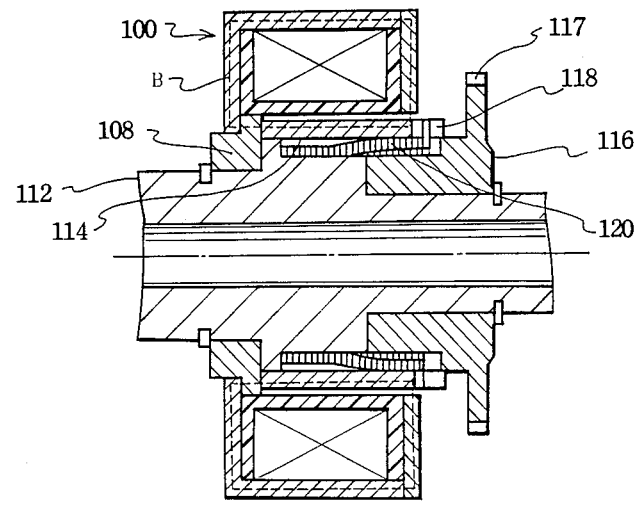
Fig. 7(b) shows a front sectional view of the second embodiment while current is passing.
Figure 8A:
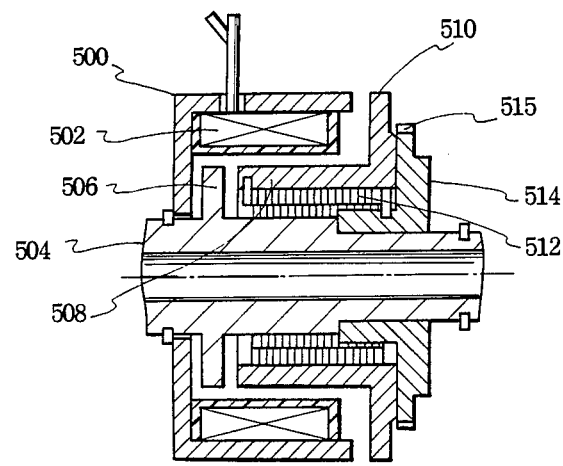
FIG. 8(a) shows a front sectional view of a conventional electromagnetic spring clutch while no current is passing.
Figure 8B:
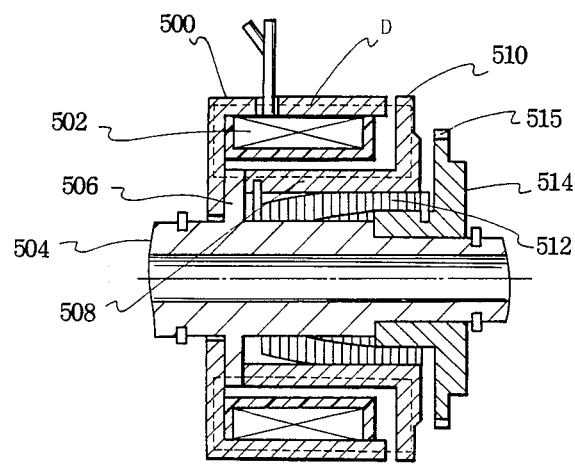
FIG. 8(b) shows a front sectional view of the conventional electromagnetic spring clutch while current is passing.

When current is passed through the electromagnetic coil 106, as shown in FIG. 7(b), a magnetic circuit indicated by broken line B is generated around the field core 100.

Then, the armature 114 is attracted to the field core 100 by the magnetic force until the inner end face of the armature 114 comes into contact with the bearing 108. This contact of the armature 114 with the bearing 108 will give rise to frictional force between the bearing 108 and the inner end face of the armature 114 so that the rotation of the armature 114 is braked. At the same time, the rotation of the coil spring 120 also is braked since one end of the coil spring 120 is caught by the slit 118 on the armature 114.

The master driving axle 116 and the slave driving axle 112 keep rotating under the turning effort from the input device. Therefore, the coil spring 120 will be under such a force as enlarges the diameter thereof from the end caught by the armature 114, loosening its winding on the master driving axle 116. Then, gradually the connection between the slave driving axle 112 and the master driving axle 116 gets released until both the slave driving axle 112 and a rotated part (not shown) stops rotation.

Contrary to the electromagnetic spring clutch of the first embodiment, this type of an electromagnetic spring clutch releases the connection between both the axles 112 and 116 when the electromagnetic coil has had current passed.

Two embodiments have been described. Use was made of the field core having open sides, but such a field core may be used as is in the form of a bottom-attached cylinder, with closed sides. The field core used had the yoke section fixed of the open end of the core section with a bracket-shaped section, but, for example, the field core may be made by bending a plate material into a rectangle in section and forming both the edge sections or by cutting an angular pipe, rectangular in section, perpendicularly to the axis, thus forming both the core and yoke sections in a body.

As is evident from the above description, this invention is effective for providing electromagnetic spring clutches at low cost, since the field core may be composed of the core section and the yoke section and the armature, made simply of hollow round rod, has so simple a form as to cut down the material waste.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electromagnetic spring clutch having:
   a field core having a built-in electromagnetic coil and an axial direction;
   an armature mounted within said electromagnetic coil and movable in said axial direction, said armature having an end face;
   a master driving axle rotatably inserted in said armature;
   a slave driving axle coaxial with said master driving axle and rotatable freely with respect to said master driving axle; and
   a coil spring within said armature and covering the outer faces of said master and slave driving axles, one end of said coil spring being fixed on the outer face of said master driving axle, the other end thereof being caught by said armature, said spring being mounted to tighten in the rotational direction of said master driving axle,
   whereby said master driving axle idles with respect to said slave driving axle when no current is passing through said electromagnetic coil; and
   whereby when current is passing through said electromagnetic coil, said armature is energized by said electromagnetic coil to move in the axial direction until said end face comes into contact with a fixed element on said field core, and the rotation of said armature about the axis is braked causing tightening of said coil spring until both said master and slave axles are connected, with transmission of the rotation of said master driving axle to said slave driving axle,
   said armature having the form of cylinder; and
   said field core being comprised of a core section with a u-shaped bracket section having open sides and an open end and a yoke section fixed to the open end of said bracket section, said yoke section having a through-hole in the middle thereof in which said cylindrical armature is movably inserted.

2. An electromagnetic spring clutch according to claim 1, wherein said core section of said field core is comprised of a plate material bent into a shape and said yoke section is fixed on the open end of a bracket section.

3. An electromagnetic spring clutch according to claim 1, wherein an abraded powder reservoir is provided inside said field core.

4. An electromagnetic spring clutch according to claim 1, wherein, within said field core, a plate made of a magnetizable material is rotatably positioned about said slave driving axle at a position to contact the end face of said armature when said armature is attracted to said field core.

5. An electromagnetic spring clutch according to claim 1, wherein a flange section of a magnetizable material is provided on the outer face of said slave driving axle.

6. An electromagnetic spring clutch according to claim 1, wherein a large diameter section is provided on one or both of said master and said slave driving axles.

7. An electromagnetic spring clutch according to claim 6 wherein the large diameter section is of a non-magnetizable material.

8. An electromagnetic spring clutch according to claim 6, wherein the large diameter section is coated with a non-magnetizable material.

9. An electromagnetic spring clutch having:
- a field core having an inner wall, a built-in electromagnetic coil and an axial direction;
- an armature provided within said electromagnetic coil and movable in said axial direction, said armature having an end face;
- a master driving axle rotatably inserted in said armature;
- a slave driving axle coaxial with said master driving axle; and
- a coil spring mounted within said armature covering the outer faces of said master and slave driving axles, one end of said coil spring being mounted to be caught by said armature, said coil spring being mounted to tighten in the rotational direction of said master driving axle,
- whereby when no current is passing through said electromagnetic coil, said coil spring is wound tightly so as to connect both said master and slave driving axles, with transmission of the rotation of said master driving axle to said slave driving axle; and
- whereby when current is passing through said electromagnetic coil, said armature is energized by said electromagnetic coil to move in the axial direction until said end face comes into contact with the inner wall of said field core, and the rotation of said armature about the axis is braked causing loosening of said coil spring until the connection between both said master and slave driving axles is released, wherein said armature has a form of a cylinder, and wherein said field core comprises a core section with a u-shaped bracket section having open sides and an open end and a yoke section fixed to the open end of said bracket section, said yoke section having a through-hole in the middle thereof in which said cylindrical armature is movably inserted.

10. An electromagnetic spring clutch according to claim 9, wherein the other end of said coil spring is fixed on the outer face of said slave driving axle and the one end is always caught by said armature.

11. An electromagnetic spring clutch according to claim 9, wherein said core section of field core comprises a plate material bent into a u-shape and said yoke section is fixed to the open end of said bracket section.

12. An electromagnetic spring clutch according to claim 9, wherein a large diameter section is provided on one or both of said master and said slave driving axles for guiding the rotation of said armature.

13. An electromagnetic spring clutch according to claim 12, wherein the large diameter section is formed of a non-magnetizable material.

* * * * *